US010895956B2

(12) United States Patent
Sachidanandam et al.

(10) Patent No.: US 10,895,956 B2
(45) Date of Patent: Jan. 19, 2021

(54) RESTRUCTURING VIEW OF MESSAGES BASED ON CONFIGURABLE PERSISTENCE

(71) Applicant: Microsoft Technology Licensing, LLC, Redmond, WA (US)

(72) Inventors: Vignesh Sachidanandam, Seattle, WA (US); Hiroshi Tsukahara, Bellevue, WA (US); Ned Bearer Friend, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 744 days.

(21) Appl. No.: 14/572,814

(22) Filed: Dec. 17, 2014

(65) Prior Publication Data

US 2016/0182426 A1 Jun. 23, 2016

(51) Int. Cl.
*G06F 3/0482* (2013.01)
*G06Q 10/10* (2012.01)
*H04M 1/725* (2006.01)

(52) U.S. Cl.
CPC ......... *G06F 3/0482* (2013.01); *G06Q 10/107* (2013.01); *H04M 1/72552* (2013.01); *H04M 1/72566* (2013.01)

(58) Field of Classification Search
CPC .......................... G06F 3/0482; G06Q 10/107
See application file for complete search history.

(56) References Cited

U.S. PATENT DOCUMENTS

| | | | |
|---|---|---|---|
| 7,213,210 B2 | 5/2007 | Reysa | |
| 7,454,466 B2 | 11/2008 | Bellotti et al. | |
| 7,472,357 B1* | 12/2008 | Satterfield | G06F 3/048 709/206 |
| 8,161,122 B2* | 4/2012 | Sood | G06Q 10/107 709/206 |
| 8,639,552 B1 | 1/2014 | Chen et al. | |
| 2004/0039786 A1 | 2/2004 | Horvitz et al. | |
| 2004/0153431 A1* | 8/2004 | Bhogal | H04L 51/12 |
| 2005/0004990 A1* | 1/2005 | Durazo | G06Q 10/107 709/206 |

(Continued)

OTHER PUBLICATIONS

Holly, Russell, "Google is testing an army of new features for Gmail", Published on: Apr. 2, 2014 Available at: http://www.geek.com/android/google-is-testing-an-army-of-new-features-for-gmail-1589767/.

Poremsky, Diane, "Using the Calendar Peek in Outlook 2013", Published on: Jul. 26, 2012 Available at: http://www.slipstick.com/outlook/2013/the-calendar-peek-in-outlook-2013/.

(Continued)

*Primary Examiner* — Justin R. Blaufeld
(74) *Attorney, Agent, or Firm* — Michael Best & Friedrich LLP

(57) ABSTRACT

Restructuring a view of messages based on configurable persistence is provided. An application such as a communication application displays summaries of messages within a summary pane of a messaging user interface (UI). The messages include emails. An action is detected to reorder one of the summaries on a top location of a date section of the summary pane. Reorder options are displayed to identify a reorder time of the summary. A selection of one of the reorder options is detected as the reorder time. The summary is relocated to the top location of the date section of the summary pane to display the first summary at the top location of the date section during the reorder time.

18 Claims, 11 Drawing Sheets

(56) References Cited

U.S. PATENT DOCUMENTS

| | | | | |
|---|---|---|---|---|
| 2005/0166157 | A1* | 7/2005 | Ollis | G06F 3/0482 |
| | | | | 715/764 |
| 2006/0069604 | A1* | 3/2006 | Leukart | G06Q 10/1093 |
| | | | | 715/792 |
| 2006/0074844 | A1* | 4/2006 | Frankel | G06Q 10/06 |
| 2007/0061308 | A1* | 3/2007 | Hartwell | G06F 3/0484 |
| 2008/0235335 | A1* | 9/2008 | Hintermeister | G06Q 10/107 |
| | | | | 709/206 |
| 2008/0270560 | A1* | 10/2008 | Tysowski | H04L 51/22 |
| | | | | 709/207 |
| 2009/0235196 | A1* | 9/2009 | MacBeth | G06F 3/04842 |
| | | | | 715/780 |
| 2010/0199180 | A1* | 8/2010 | Brichter | G06F 3/0485 |
| | | | | 715/702 |
| 2011/0161832 | A1* | 6/2011 | Runstedler | H04L 51/26 |
| | | | | 715/752 |
| 2012/0149342 | A1* | 6/2012 | Cohen | H04L 51/26 |
| | | | | 455/412.2 |
| 2013/0014040 | A1* | 1/2013 | Jagannathan | H04M 1/72586 |
| | | | | 715/765 |
| 2013/0151963 | A1 | 6/2013 | Costenaro et al. | |
| 2014/0082521 | A1* | 3/2014 | Carolan | H04L 51/36 |
| | | | | 715/752 |
| 2014/0143738 | A1* | 5/2014 | Underwood, IV | G06F 3/0482 |
| | | | | 715/863 |
| 2014/0201675 | A1* | 7/2014 | Joo | G06Q 30/0267 |
| | | | | 715/784 |
| 2014/0280616 | A1 | 9/2014 | Ramanathan et al. | |
| 2014/0289658 | A1* | 9/2014 | Gelernter | G06F 3/0481 |
| | | | | 715/765 |
| 2015/0317073 | A1* | 11/2015 | Hull | G06Q 10/103 |
| | | | | 715/753 |
| 2015/0334061 | A1* | 11/2015 | Baird | H04L 51/24 |
| | | | | 709/206 |
| 2016/0154556 | A1* | 6/2016 | Cheung | H04W 4/08 |
| | | | | 715/752 |
| 2017/0357435 | A1* | 12/2017 | Taslimi | G06F 3/0482 |

OTHER PUBLICATIONS

Leamen, Eric, "Evomail+ for iPhone arrives as a rebuilt, redesigned email client for iOS 7", Published on: Jan. 14, 2014 Available at: http://currenteditorials.com/2014/01/14/evomail-for-iphone-arrives-as-a-rebuilt-redesigned-email-client-for-ios-7/.

"Conditional Formatting: Highlight your most important mails", Published on: May 10, 2012 Available at: http://blogs.office.com/2012/05/10/conditional-formatting-highlight-your-most-important-mails/.

"Fast Mail", Retrieved on: Oct. 13, 2014 Available at: https://www.fastmail.fm/.

"Boomerang for Gmail", Retrieved on: Oct. 13, 2014 Available at: http://www.boomeranggmail.com/.

"Boomerang for Gmail—Easy, powerful email follow-up for Gmail", Published on: Apr. 30, 2013 Available at: http://www.boomeranggmail.com/l/email-follow-up-gmail.html.

Hoang, Le, "Outlook: Change the Font and Color of Unread Emails", Published on: Oct. 6, 2012 Available at: http://www.tech-recipes.com/rx/30698/outlook-change-font-color-unread-emails/.

Rathbone, Andy, "Windows 8 Touch and Mouse Commands", Published on: Nov. 27, 2012 Available at: http://www.dummies.com/how-to/content/windows-8-touch-and-mouse-commands.html.

"Boxer", Published on: Sep. 8, 2014 Available at: http://www.getboxer.com/.

Parab, Pranay, "Five of the Best Alternative Email Clients for iOS", Published on: Jul. 29, 2014 Available at: http://gadgets.ndtv.com/apps/features/five-of-the-best-alternative-email-clients-for-ios-566976.

"Triage—First aid for your inbox", Published on: Apr. 16, 2013 Available at: http://www.triage.cc/.

"International Search Report and Written Opinion Issued in PCT Application No. PCT/US2015/065925", dated Apr. 25, 2016, 13 Pages.

"International Preliminary Report on Patentability Issued in PCT Application No. PCT/US2015/065925", dated Mar. 14, 2017, 7 Pages.

"Second Written Opinion Issued in PCT Application No. PCT/US2015/065925", dated Nov. 29, 2016, 5 Pages.

* cited by examiner

RESTRUCTURING VIEW OF MESSAGES BASED ON CONFIGURABLE PERSISTENCE

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as hand-held computers, smart phones, tablet devices, and comparable devices have become common. Such devices execute a wide variety of applications ranging from communication applications to complicated analysis tools. Many such applications display messages through a display and enable users to provide input associated with the applications' operations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to restructuring a view of messages based on a configurable persistence. In some example embodiments, a communication application may display summaries of the messages within a summary pane of a messaging user interface (UI). An action may be detected to reorder one of the summaries to on a top location within a date section of the summary pane based on a selection of one of the reorder options. The reorder options may be displayed to identify a reorder time of the summary. The selection of one of the reorder options may be detected as the reorder. The summary may be displayed at the particular section of the summary pane until the selected duration of the reorder time expires.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
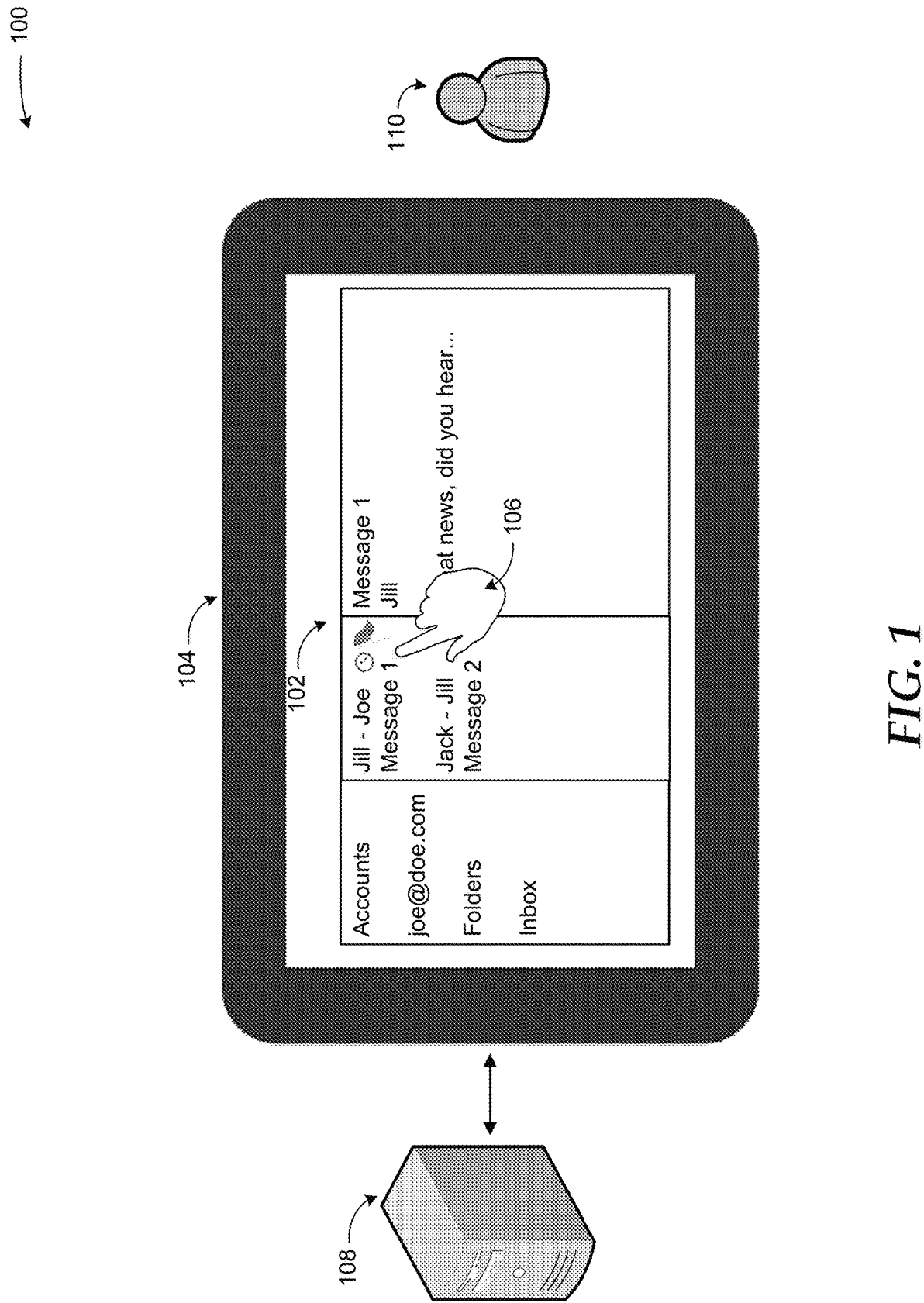
FIG. 1 is a conceptual diagram illustrating an example of restructuring a view of messages based on a configurable persistence, according to embodiments.

As briefly described above, a view of messages may be restructured based on a configurable persistence by a communication application. Summaries of the messages may be displayed within a summary pane of a messaging user interface (UI). The messages may include emails, text-based messages, audio messages, and video messages, among others. An action may be detected to reorder one of the summaries on a top location of a date section of the summary pane based on a selection of a reorder option. Reorder options may be displayed to identify a reorder time of the summary. A selection of one of the reorder options may be detected as the reorder time. A default reorder time may include today. The summary may be relocated to the top location of a date section of the summary pane to display the summary on the top location during the date time.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to restructure a view of messages based on a configurable persistence. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example of restructuring a view of messages based on a configurable persistence, according to embodiments.

In a diagram 100, a computing device 104 may execute a communication application 102. The computing device 104 may include a tablet device, a laptop computer, a desktop computer, and a smart phone, among others. The computing device 104 may display the communication application 102 to a user 110. The user 110 may be allowed to interact with the communication application 102 through an input device or touch enabled display component of the computing device 104. The computing device 104 may include a display device such as the touch enabled display component, and a monitor, among others to provide a user interface of the communication application 102 to the user 110.

The communication application 102 may relocate a summary of a message to a top location of a date section of a summary pane based on an action 106 to reorder the summary to the top location of a date section such as today. The date section may also include today, tomorrow, yesterday, next week, previous week, next month, previous month, or custom, among others. The action 106 may include operations to reorder the summary to the top location of the date section based on a reorder time selected from reorder options. A default reorder time may be today. The operations may be executed in response to an interaction of the user 110 with the summary of the message displayed by the communication application 102. The operations may also be executed automatically in response to an inference of a due date within a content of the message. The user 110 may interact with the communication application 102 with a keyboard based input, a mouse based input, a voice based input, a pen based input, and a gesture based input, among others. The gesture based input may include one or more touch based actions such as a touch action, a swipe action, a press and hold, a swipe and hold, or a combination of each, among others.

The communication application 102 may retrieve messages from a local source such as a storage media, a memory, a hard disk drive, and a solid state drive, among others. The messages may also be received from a remote source such as a server 108 that provides messaging services. The messaging services may relay messages transmitted from other sources sent to an account associated with the user 110. The communication application 102 may receive the messages and restructure the summaries of the messages based on a configurable persistence to be displayed on a top location of a date section of a summary pane on the computing device 104.

While the example system in FIG. 1 has been described with specific components including the computing device 104, the communication application 102, embodiments are not limited to these components or system configurations and can be implemented with other system configuration employing fewer or additional components.

Figure 2:
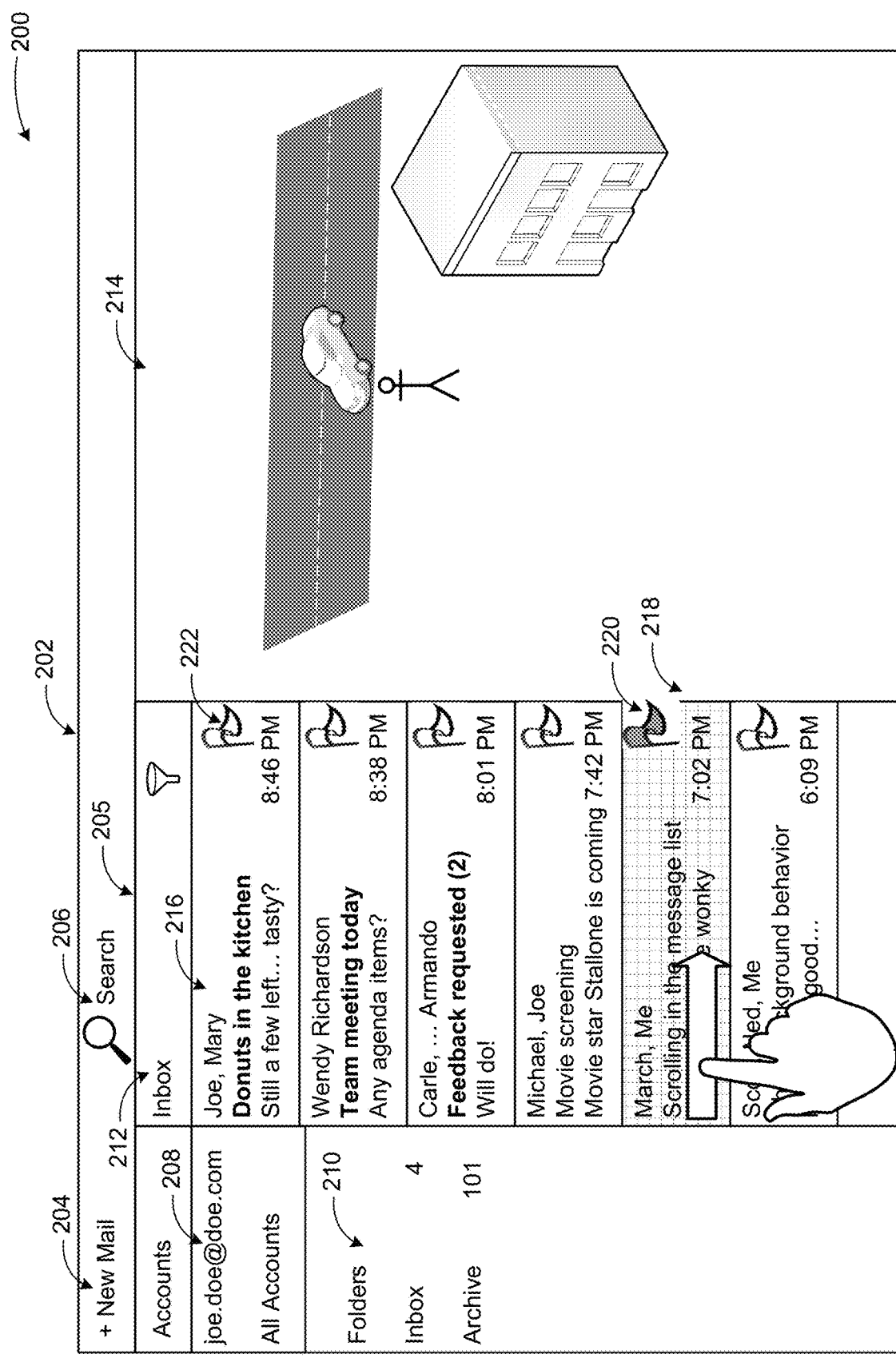
FIG. 2 illustrates an example of displaying summaries of messages on a summary pane of a messaging user interface (UI), according to embodiments.

FIG. 2 illustrates an example of displaying summaries of messages on a summary pane of a messaging user interface (UI), according to embodiments.

In a diagram 200, a communication application 202 may restructure summaries of messages based on a configurable persistence. The communication application 202 may provide a summary pane 205 to display summaries of messages and a content pane 212 to display a content of a message.

The communication application 202 may provide controls to manage messages, conversations, or communication, among others. The messages may include an email, a text based message, an audio message, or a video message, among others. A new message control 204 may include operations to provide a UI to create a new message. A search control 206 may include operations to search the messages based on a search parameter to locate a message that matches the search parameter. The communication application 202 may also provide controls to manage accounts associated with messages. An account control 208 may be used to select messages associated with an account. Folder controls 210 may be selected to display summaries of messages in folders associated with the account. The folders may include an inbox, a sent folder, an outbox, and an archive, among others.

A summary pane 205 of the UI of the communication application 202 may display summaries of messages stored in a folder 211, such as an inbox. The summary pane 205 may also provide an importance filter control. The importance filter control may include operations to identify messages classified as an important message and display summaries of the messages classified as an important message on the summary pane 205.

A summary 216 of a message may display a sender identification, a receiver identification, a message subject, one or more lines summary of a message content, or a timestamp, among other attributes of an associated message. The timestamp may be a time of when the message was sent. Alternatively, the timestamp may be a time of when the message was received. The timestamp may also be a time of when the message was reordered. The reorder operations may include relocating the message to a top location of a date section 203 such as a today section or a yesterday section, among others.

A summary 216 of a message classified as an important message may display a an importance flag control 222. The importance flag control 222 may be activated to classify an associated message as an important message. The summary 216 may also display a message subject in a bold font scheme to indicate the associated message as unread. Other display schemes may be used to indicate a classification of the associated message of the summary 216 as an important or an unread message. An example of another display scheme to inform of a classification of an associated message may include a highlighting scheme or a contrasting background color scheme.

A summary 218 may be displayed with an importance flag control 220 that is activated. The activated status of the importance flag control 220 may indicate an important message classification of an associated message. The summary 218 may also display a highlighting scheme to indicate an action 224 detected on the summary 218. A content associated with a message of the summary 218 may be displayed on a content pane 214 adjacent to the summary pane 205 in response to an action selecting the summary 218.

An action 224 may select the summary 218 to relocate the summary 218 to a top location in the date section 203 of the summary pane 205 based on a selection of a reorder option. The reorder option may be today by default. The summary 218 may be relocated to the top location of the date section 203 of the summary pane 205 to reorder the summary 218 on the top location of the date section 203. The action 224 may include a swipe action. The swipe action may move in a horizontal direction such a rightward movement or a leftward movement. The action 224 may also include a touch action, a mouse click event, a hover event, or a keyboard action, among others.

Figure 3:
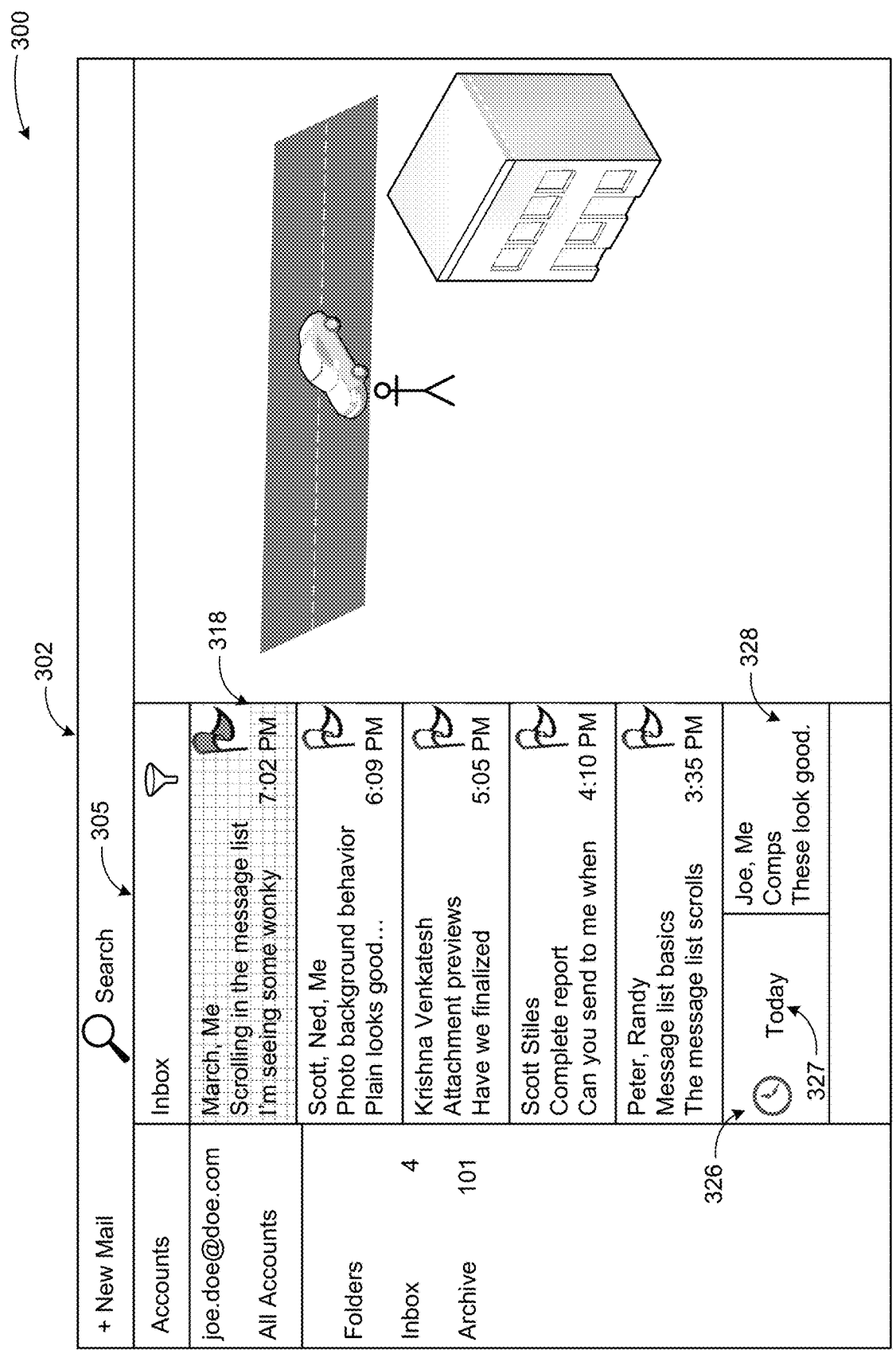
FIG. 3 illustrates an example of placing a summary of a message on a top location of a date section of the summary pane based on a selection of a reorder option, according to embodiments.

FIG. 3 illustrates an example of placing a summary of a message on a top location of a date section of the summary pane based on a selection of a reorder option, according to embodiments.

In a diagram 300, a communication application 302 may highlight a summary 318 of a message to indicate a selected status of the summary 318. Content of the message may be displayed on a content pane of the communication application 302.

An action to reorder a summary 328 of a message may reduce a horizontal length of the summary by a factor of ½. The action may include a swipe action detected on the summary 328. The swipe action may be detected to have a rightward direction. The reduced summary may display reduced information of an associated message compared to a full size summary within a transient state of the summary 328. The summary 328 may be placed adjacent to a right edge of a summary pane 305. The summary 328 may be placed on a left side of the right edge. A reorder option 327 may be displayed between a left edge of the summary pane 305 and the summary 328. The reorder option 327 may include a default reorder option. The default reorder option may be configurable by an authorized user. The default reorder option may include today.

A reorder control 326 may include operations to relocate the summary 328 to a top location in a date section 303 of the summary based on a selection of a reorder option. In response to an activation of the reorder control 326, the summary 328 may be relocated to the top location of the date section 303 of the summary pane 305 to persist on the top location of the date section 303 during a reorder time that corresponds to the reorder option 327. The summary pane 305 may persist at the top location of the date section 303 until an expiration of the reorder time as selected in the reorder option 327, such as today.

Figure 4:
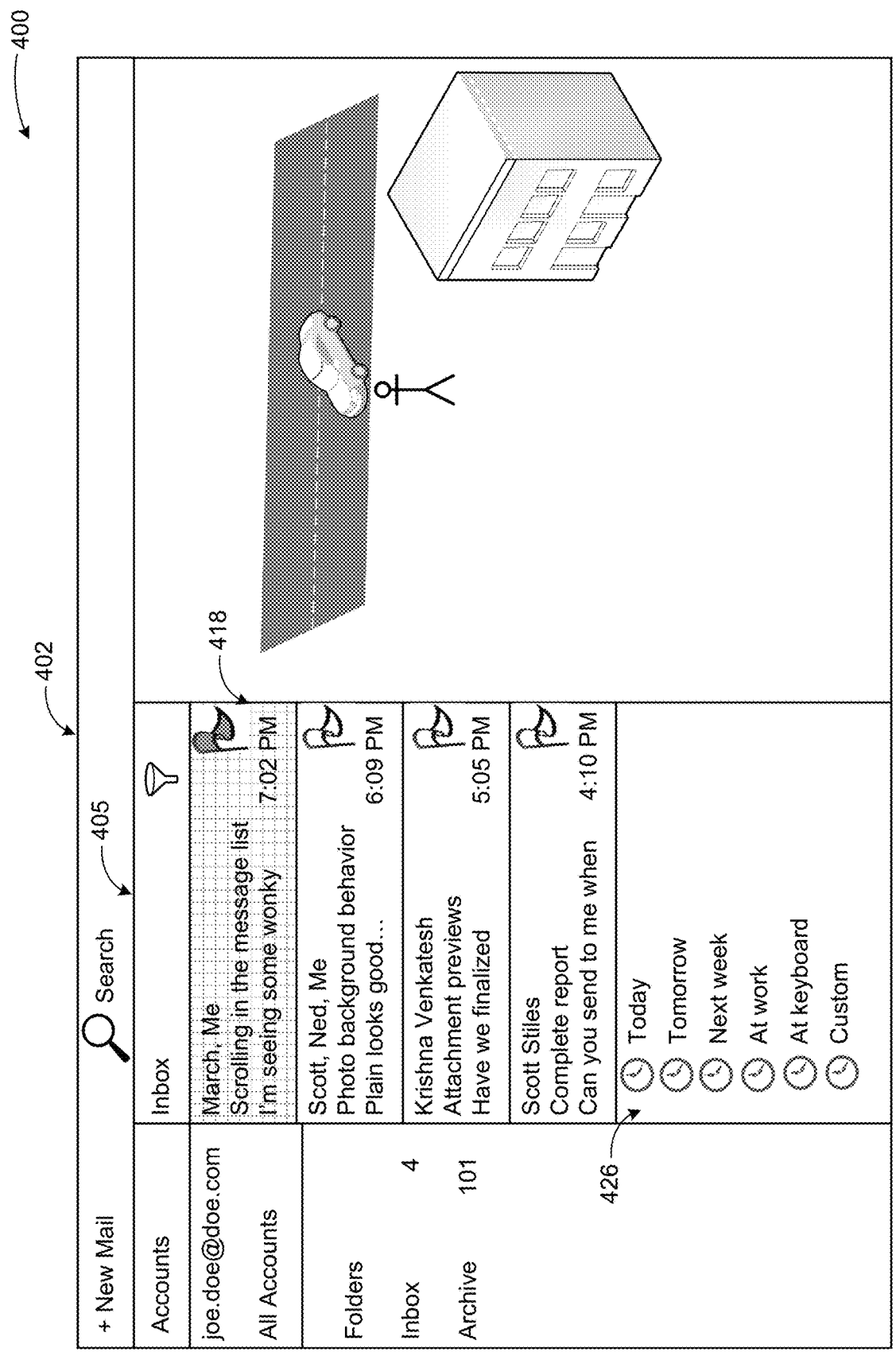
FIG. 4 illustrates an example of providing reorder options while displaying a summary of a message on the top location of the date section, according to embodiments.

FIG. 4 illustrates an example of providing reorder options while displaying a summary of a message on the top location of the date section, according to embodiments.

In a diagram 400, a communication application 402 may relocate a summary 418 of a message in response to an action to reorder the summary on a top location of a date section 403 of a summary pane 405. A menu 426 of reorder options may be displayed to allow a user to select one of the reorder options as a reorder time to persist the summary 418 on the top location of the date section 403 associated with the reorder time such as today.

The reorder options may include a today option to persist the summary on the top location of the date section 403 prior to an expiration of reorder time of today. The reorder options may also include a today, tomorrow, next week, at work, at home, at keyboard, custom, respectively, from a time of a selection of one of the options on the menu 426. A reorder option of now may include operations to move the summary to a top location of the date section 403 of today to persist the summary at the top location prior to an expiration of reorder time of today. A reorder option of tomorrow may include operations move the summary to a top location of the date section 403 of tomorrow to persist the summary at the top location prior to an expiration of reorder time of tomorrow. The tomorrow section may be hidden by default. A user may be enabled to scroll up to view the summary at the top location of the tomorrow section.

A reorder option of at work or at home may include operations to move the summary to a top location of the date section 403 of today or tomorrow based on a past history to persist the summary at the top location prior to an expiration of a reorder time of today or tomorrow. The summary may be relocated to the top location of the date section 403 in response a detection of a user location at home or at work. In addition, a reorder option of at keyboard may include operations to move the summary to a top location of the date section 403 of today or tomorrow based on a past history to persist the summary at the top location prior to an expiration of a reorder time of today or tomorrow. The summary may be relocated to the top location of the date section 403 in response a detection of a user accessing a physical keyboard. Furthermore, a reorder option of custom may include operations to move the summary to a top location of the date section 403 associated with a custom date based on a selection/or configuration by a user or system to persist the summary at the top location prior to an expiration of a reorder time as determined by the custom selection.

The menu 420 may be displayed below the summary 418 or other summaries or adjacent to a bottom edge of the summary pane 405. The reorder option may be configurable by an authorized user through configuration controls provided by the communication application 402.

Figure 5:
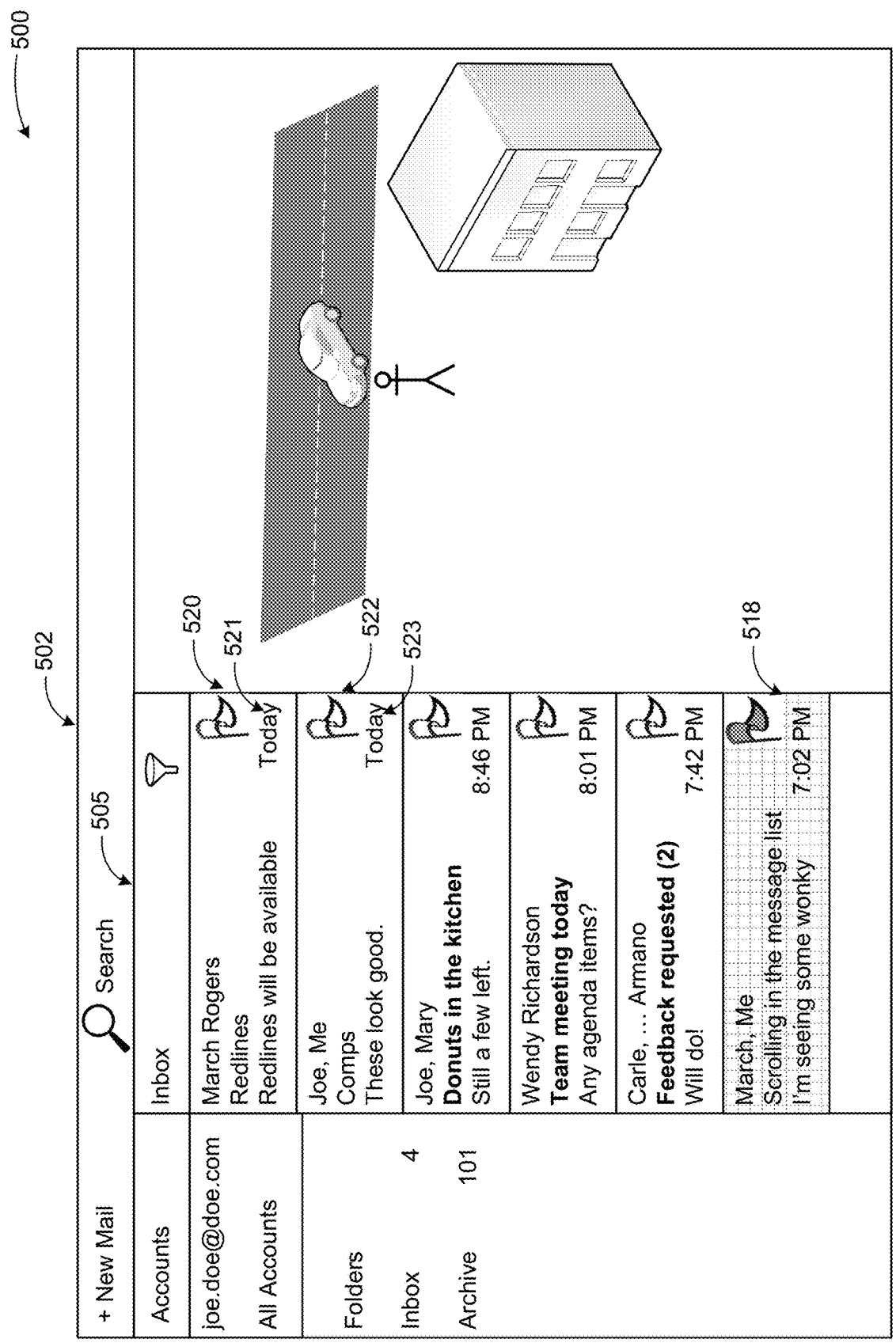
FIG. 5 illustrates an example of displaying summaries of messages on a top location of the date section of the summary pane, according to embodiments.

FIG. 5 illustrates an example of displaying summaries of messages on a top location of a date section of the summary pane, according to embodiments.

In a diagram 500, a communication application 502 may display a summary 520 of a message and a summary 522 of a message on a top location of a date section 503 of a summary pane 505. The summary 520 and the summary 522 may be placed on the top location of the date section 503 of the summary pane 505 in response to actions to reorder the summary 520 and the summary 522. A selection of a reorder option of today may relocate the summary 522 to a top location of the date section 503 of today to persist the summary 522 at the top location of the today section until an expiration of the reorder time of today.

A reorder time 521 may be displayed on the summary 520 to indicate a reorder time of persistence on the top location of the date section 503 of the summary pane. The reorder time may replace a timestamp of a delivery time of a message of the summary 520. A reorder time 523 may also be displayed on the summary 522 to indicate a reorder time of persistence on the top location of the date section 503 of the summary pane. The reorder time 521 and the reorder time 523 may replace a timestamp of associated messages displayed previously on the summary 520 and the summary 522. New summaries of incoming message may be displayed below the summary 520 and the summary 522. After an expiration of the reorder time 521 and the reorder time 523 the summary 520 and the summary 522 may be relocated to the date section 503 corresponding to a delivery timestamp of the associated messages. A content of a message associated with a selected summary 518 may be displayed on a content pane adjacent to the summary pane.

Figure 6:
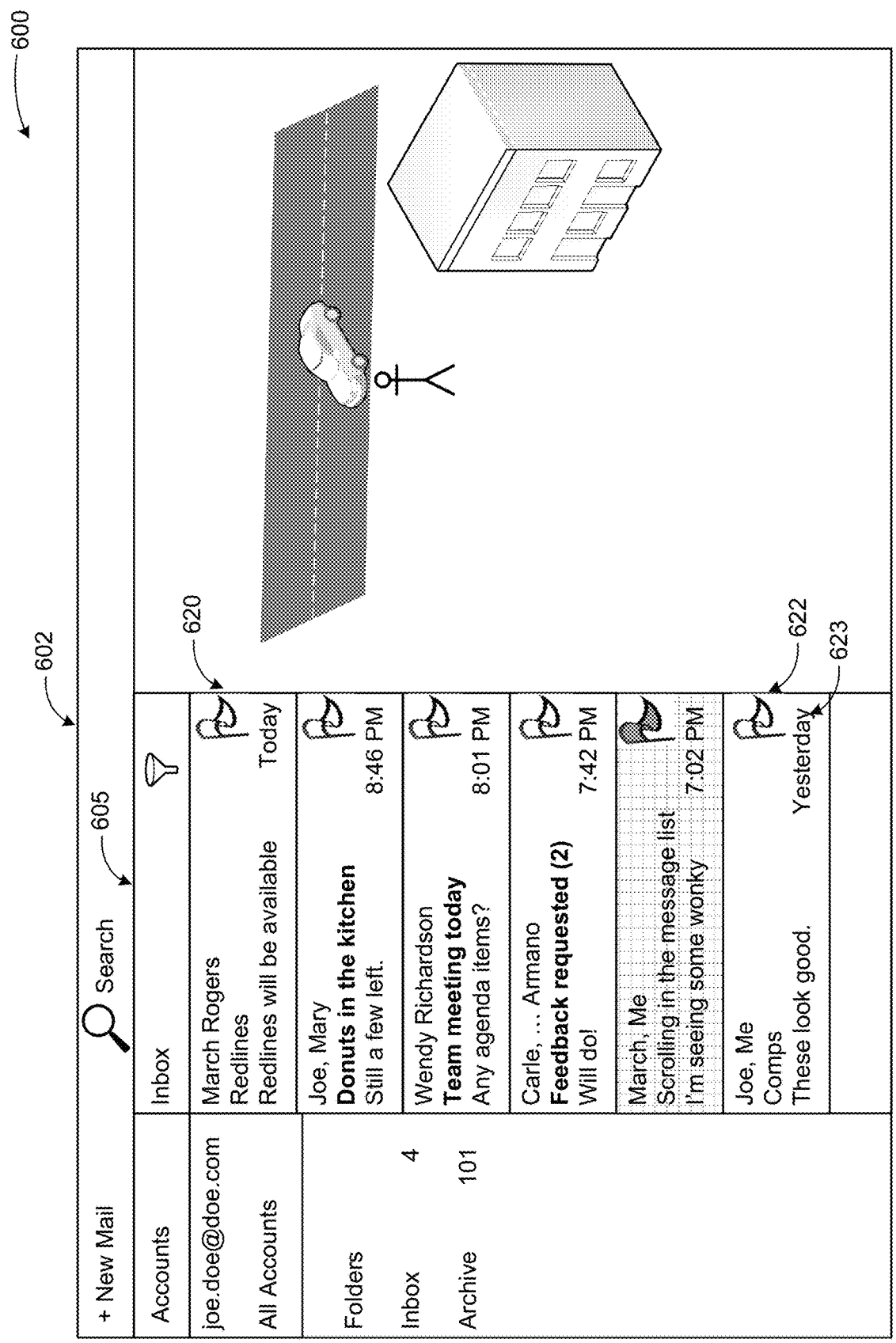
FIG. 6 illustrates an example of expiration of a reorder time of a summary of a message displayed on a top location of a date section of the summary pane, according to embodiments.

FIG. 6 illustrates an example of expiration of a reorder time of a summary of a message displayed on a top location of a date section of the summary pane, according to embodiments.

In a diagram 600, a communication application 602 may place a summary 620 of a message on a top location of a date section 603 of a summary pane 605. The summary 620 may be placed on the top location of the date section 603 to persist for a reorder time. A summary 622 of a message may have been placed on the top location of the date section 603 to persist for a reorder time, previously. The reorder time of the summary 622 may have expired. In response to an expiration of the reorder time, a current time may be displayed as a timestamp 623 on the summary 622. The summary 622 may be relocated to the date section 603 that corresponds to a timestamp provided at the expiration time of the reorder time. New summaries of incoming message may be allowed to be placed above the summary 622. New summaries may be placed below the summary 620 which may continue to persist during a reorder time on the top location of the date section 603 (such as today) of the summary pane 605.

Figure 7:
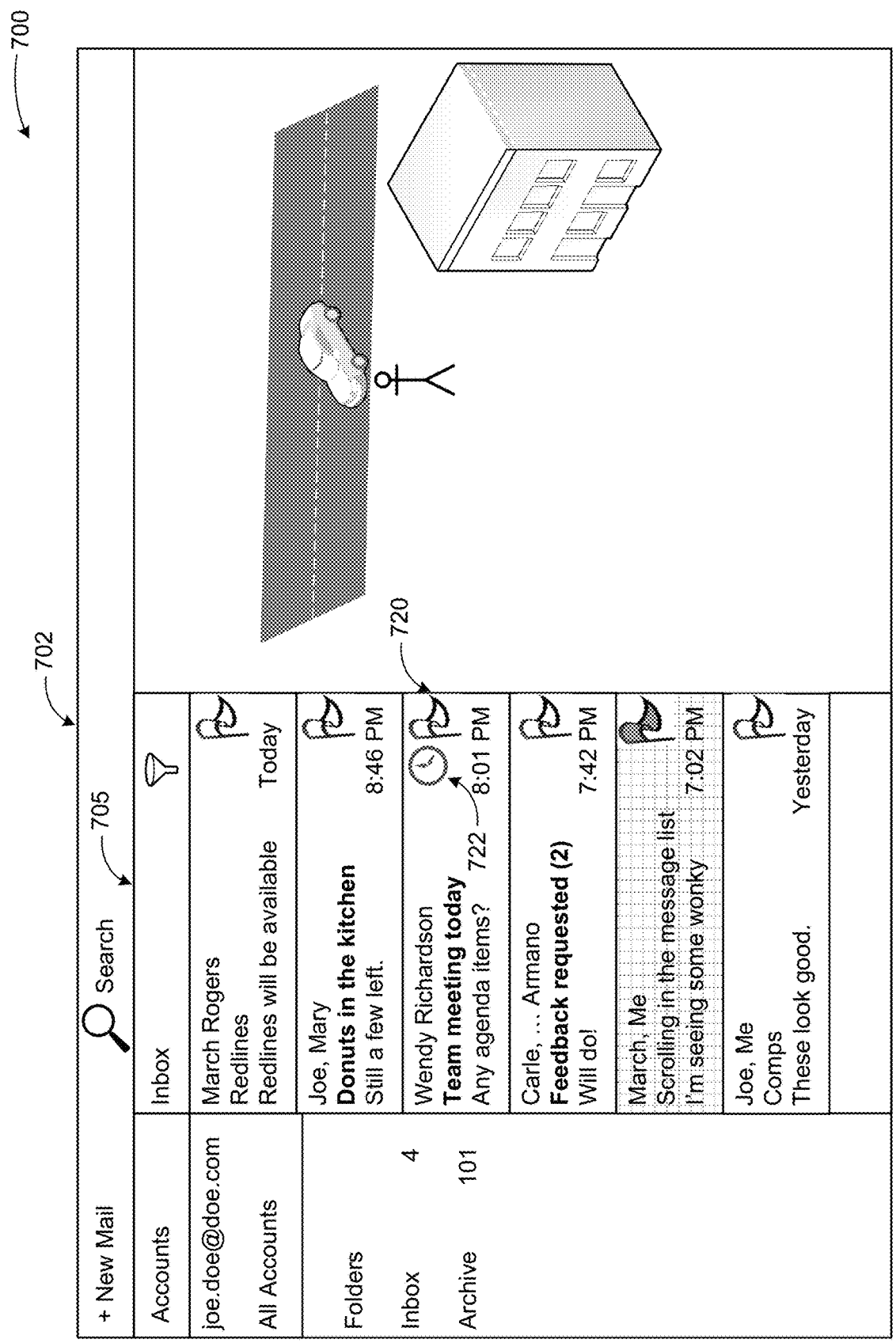
FIG. 7 illustrates an example of a reorder control to activate or deactivate display of a summary of a message on a top location of a date section of the summary pane, according to embodiments.

FIG. 7 illustrates an example of a reorder control to activate or deactivate display of a summary of a message on a top location of a date section of the summary pane, according to embodiments.

In a diagram 700, a communication application 702 may display a summary 720 of a message on a summary pane 705. The summary 720 may include a reorder control 722. The reorder control 722 may be displayed using an clock icon or a clock shape. The reorder control 722 may include operations to relocate the summary 720 on a top location of a date section 703 of the summary pane 705 based on a selection of a reorder option associated with the date section 703. The summary 720 may be placed on the top location of the date section 703 during a reorder time that is selected from reorder options, in response to an activation of the reorder control 722.

Alternatively, an active reorder control on a summary that persists on a top location of the date section 703 of the summary pane 705 may be deactivated. In response to a deactivation of the reorder control, a current time may be displayed as a timestamp on the summary in place of the reorder time. New summaries of incoming messages may be placed above the summary. A summary persisted at the top location of the today/future section may be deactivated/cleared. In response to a deactivation/clearing of the message marked for today/future, a current time may be displayed as a timestamp on the summary in place of the re-order time.

Figure 8:
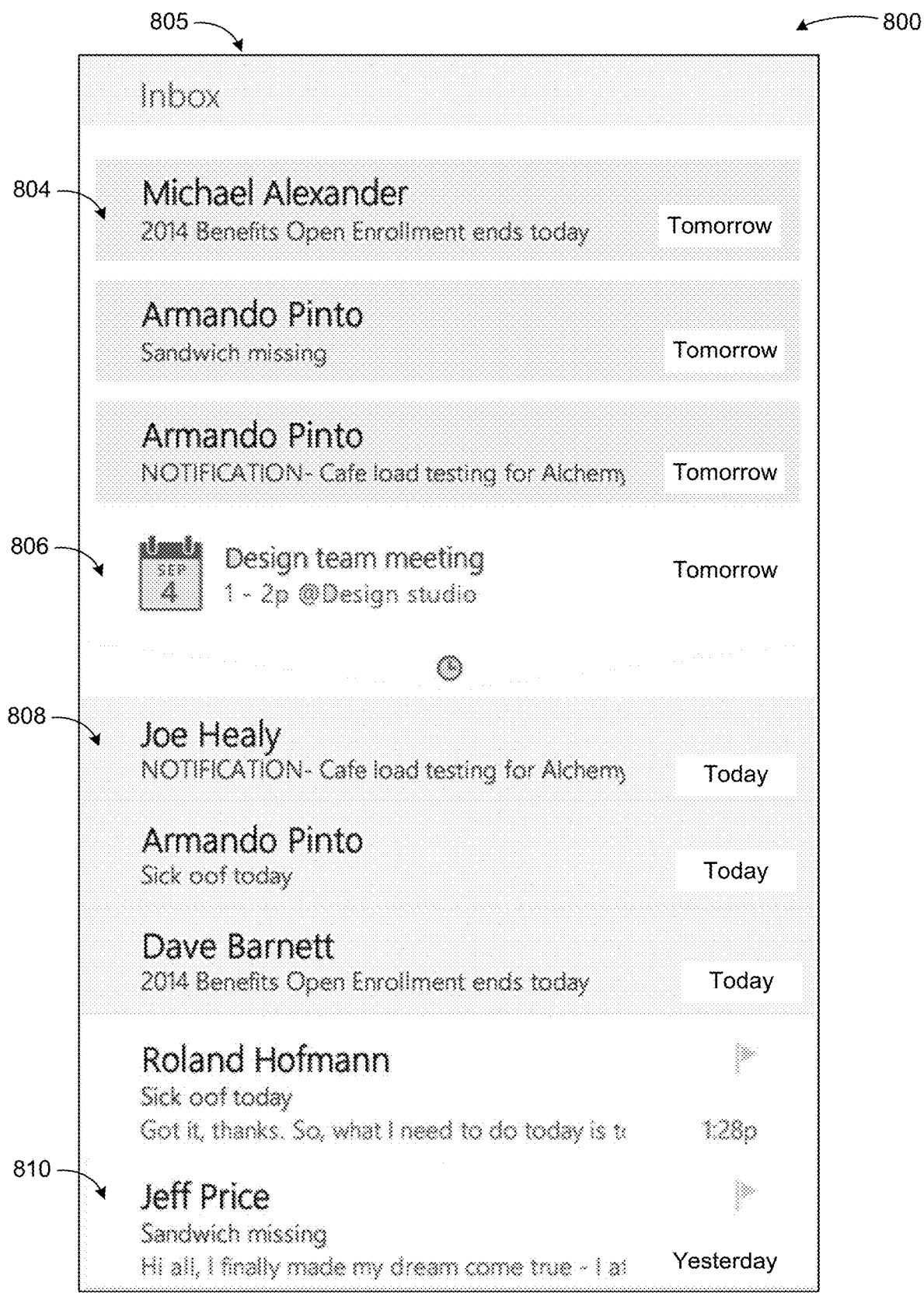
FIG. 8 illustrates an example of displaying related items associated with a summary of a message displayed on a top location of a date section of the summary pane, according to embodiments.

FIG. 8 illustrates an example of displaying related items associated with a summary of a message displayed on a top location of a date section of the summary pane, according to embodiments.

In a diagram 800, a communication application may display future items in relation to a summary 808 that may have been displayed on a top location of a date section 803 of a summary pane 805. The future items may be displayed in response to an action to scroll up the summary pane 805 to display the future items above the summary 808. Future items may include an appointment 806, or a deferred message 804, among others. The future items may be displayed during a reorder time (such as tomorrow). The reorder time may be configurable by an authorized user through configuration controls provided by the communication application.

Future items may also include upcoming calendar events/appointments, and items re-ordered (manually by the user or automatically based on the content of the message/conversation) to the tomorrow section, or any other future date. A date section 801 above the today section may display future items. A scroll action up in the summary pane 805 may enable the user peek in to the future items.

Configuration controls may be provided to configure attributes associated with relocating summaries of messages on a top location of the date section 803 of a summary pane 805. The configuration controls may allow an authorized user to configure a default reorder time, a highlight color, other visualization, or an archive folder associated with operations to reorder a summary, among others. In addition, in response to an expiration of a reorder time an item 810 (previously located at a top location of the date section 803 associated with a selection of the reorder option) may be relocated to a top location of a date section 807 such as yesterday. The date section M may be automatically selected based on the timestamp provided to the summary at the expiration of the reorder time.

The technical advantage of restructuring a view of messages on a configurable persistence may include improved usability of user interfaces that present messages, conversations, or communications, among others while distinguishing selected messages, based on a persistent location on a summary view, from other messages compared to legacy messaging solutions.

The example scenarios and schemas in FIG. 1 through 8 are shown with specific components, data types, and configurations. Embodiments are not limited to systems according to these example configurations. Restructuring a view of messages based on a configurable persistence may be implemented in configurations employing fewer or additional components in applications and user interfaces. Furthermore, the example schema and components shown in FIG. 1 through 8 and their subcomponents may be implemented in a similar manner with other values using the principles described herein.

Figure 9:
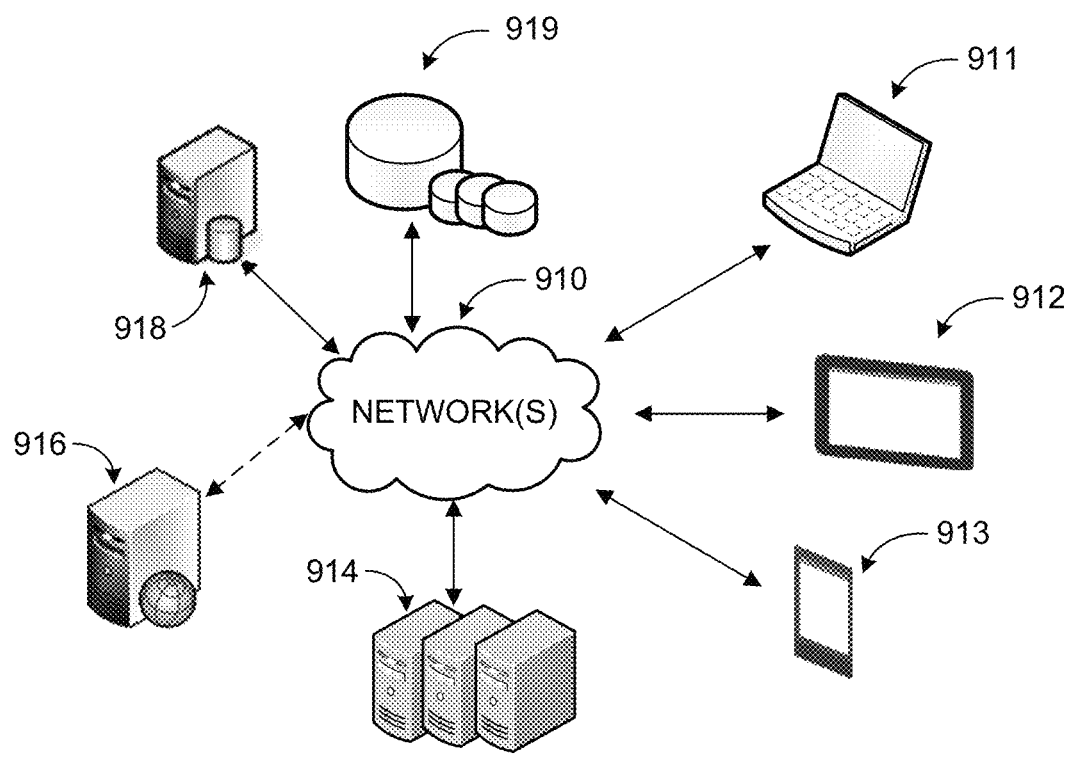
FIG. 9 is a simplified networked environment, where a system according to embodiments may be implemented.

FIG. 9 is an example networked environment, where embodiments may be implemented. A communication application configured to restructure a view of messages based on a configurable persistence may be implemented via software executed over one or more servers 914 such as a hosted service. The platform may communicate with client applications on individual computing devices such as a smart phone 913, a mobile computer 912, or desktop computer 911 ('client devices') through network(s) 910.

Client applications executed on any of the client devices 911-913 may facilitate communications via application(s) executed by servers 914, or on individual server 916. A communication application may detect an action to reorder a summary on a top location of a date section of a summary pane. A selection of a reorder option may be detected as a reorder time. The summary may be relocated to the top location of a date section to display the summary at the top location of the date section during the reorder time. The communication application may store data associated with the messages in data store(s) 919 directly or through database server 918.

Network(s) 910 may comprise any topology of servers, clients, Internet service providers, and communication media. A system according to embodiments may have a static or dynamic topology. Network(s) 910 may include secure networks such as an enterprise network, an unsecure network such as a wireless open network, or the Internet. Network(s) 910 may also coordinate communication over other networks such as Public Switched Telephone Network (PSTN) or cellular networks. Furthermore, network(s) 910 may include short range wireless networks such as Bluetooth or similar ones. Network(s) 910 provide communication between the nodes described herein. By way of example, and not limitation, network(s) 910 may include wireless media such as acoustic, RF, infrared and other wireless media.

Many other configurations of computing devices, applications, data sources, and data distribution systems may be employed to restructure a view of messages based on a configurable persistence. Furthermore, the networked environments discussed in FIG. 9 are for illustration purposes only. Embodiments are not limited to the example applications, modules, or processes.

Figure 10:
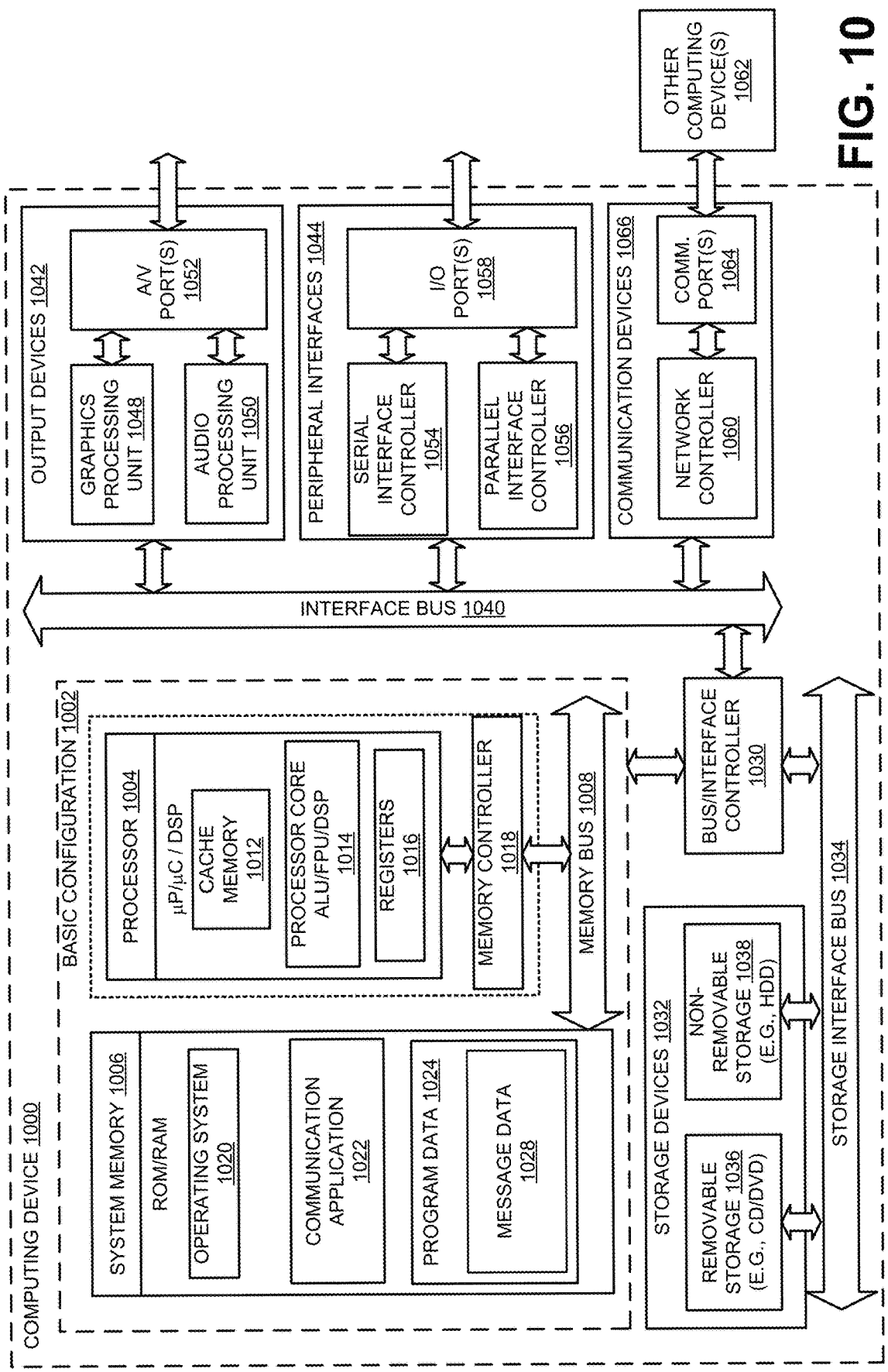
FIG. 10 illustrates a general purpose computing device, which may be configured to restructure a view of messages based on a configurable persistence, according to embodiments.

FIG. 10 illustrates a general purpose computing device, which may be configured to restructure a view of messages based on a configurable persistence, arranged in accordance with at least some embodiments described herein.

For example, the computing device 1000 may be used to restructure a view of messages based on a configurable persistence. In an example of a basic configuration 1002, the computing device 1000 may include one or more processors 1004 and a system memory 1006. A memory bus 1008 may be used for communication between the processor 1004 and the system memory 1006. The basic configuration 1002 may be illustrated in FIG. 10 by those components within the inner dashed line.

Depending on the desired configuration, the processor 1004 may be of any type, including, but not limited to, a microprocessor (µP), a microcontroller (µC), a digital signal processor (DSP), or any combination thereof. The processor 1004 may include one more levels of caching, such as a level cache memory 1012, a processor core 1014, and registers 1016. The processor core 1014 may include an arithmetic logic unit (ALU), a floating point unit (FPU), a digital signal processing core (DSP Core), or any combination thereof. A memory controller 1018 may also be used with the processor 1004, or in some implementations, the memory controller 1018 may be an internal part of the processor 1004.

Depending on the desired configuration, the system memory 1006 may be of any type including but not limited to volatile memory (such as RAM), non-volatile memory (such as ROM, flash memory, etc.), or any combination thereof. The system memory 1006 may include an operating system 1020, a communication application 1022, and a program data 1024. The communication application 1022 may detect an action to reorder a summary on a top location of a date section of a summary pane. A selection of a reorder option may be detected as a reorder time. The summary may be relocated to the top location of the date section to display the summary at the top location of the date section during the reorder time. Components of the communication application 1022 (such as a user interface) may also be displayed on a display device associated with the computing device 1000. An example of the display device may include a hardware screen that may be communicatively coupled to the computing device 1000. The display device may include a touch based device that detects gestures such as a touch action. The display device may also provide feedback in response to detected gestures (or any other form of input) by transforming a user interface of the communication application 1022, displayed by the touch based device. The program data 1024 may also include, among other data, a message data 1028, or the like, as described herein. The message data 1028 may include a message, and a summary, among others.

The computing device 1000 may have additional features or functionality, and additional interfaces to facilitate communications between the basic configuration 1002 and any desired devices and interfaces. For example, a bus/interface controller 1030 may be used to facilitate communications between the basic configuration 1002 and one or more data storage devices 1032 via a storage interface bus 1034. The data storage devices 1032 may be one or more removable storage devices 1036, one or more non-removable storage devices 1038, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 1006, the removable storage devices 1036, and the non-removable storage devices 1038 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 1000. Any such computer storage media may be part of the computing device 1000.

The computing device 1000 may also include an interface bus 1040 for facilitating communication from various interface devices (for example, one or more output devices 1042, one or more peripheral interfaces 1044, and one or more communication devices 1066) to the basic configuration 1002 via the bus/interface controller 1030. Some of the example output devices 1042 may include a graphics processing unit 1048 and an audio processing unit 1050, which may be configured to communicate to various external devices, such as a display or speakers via one or more A/V ports 1052. One or more example peripheral interfaces 1044 may include a serial interface controller 1054 or a parallel interface controller 1056, which may be configured to communicate with external devices, such as input devices (for example, keyboard, mouse, pen, voice input device, touch input device, etc.) or other peripheral devices (for example, printer, scanner, etc.) via one or more I/O ports 1058. An example communication device 1066 may include a network controller 1060, which may be arranged to facilitate communications with one or more other computing devices 1062 over a network communication link via one or more communication ports 1064. The one or more other computing devices 1062 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 1000 may be implemented as a part of a general purpose or specialized server, mainframe, or similar computer, which includes any of the above functions. The computing device 1000 may also be implemented as a personal computer including both laptop computer and non-laptop computer configurations.

Example embodiments may also include methods to restructure a view of messages based on a configurable persistence. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 11:
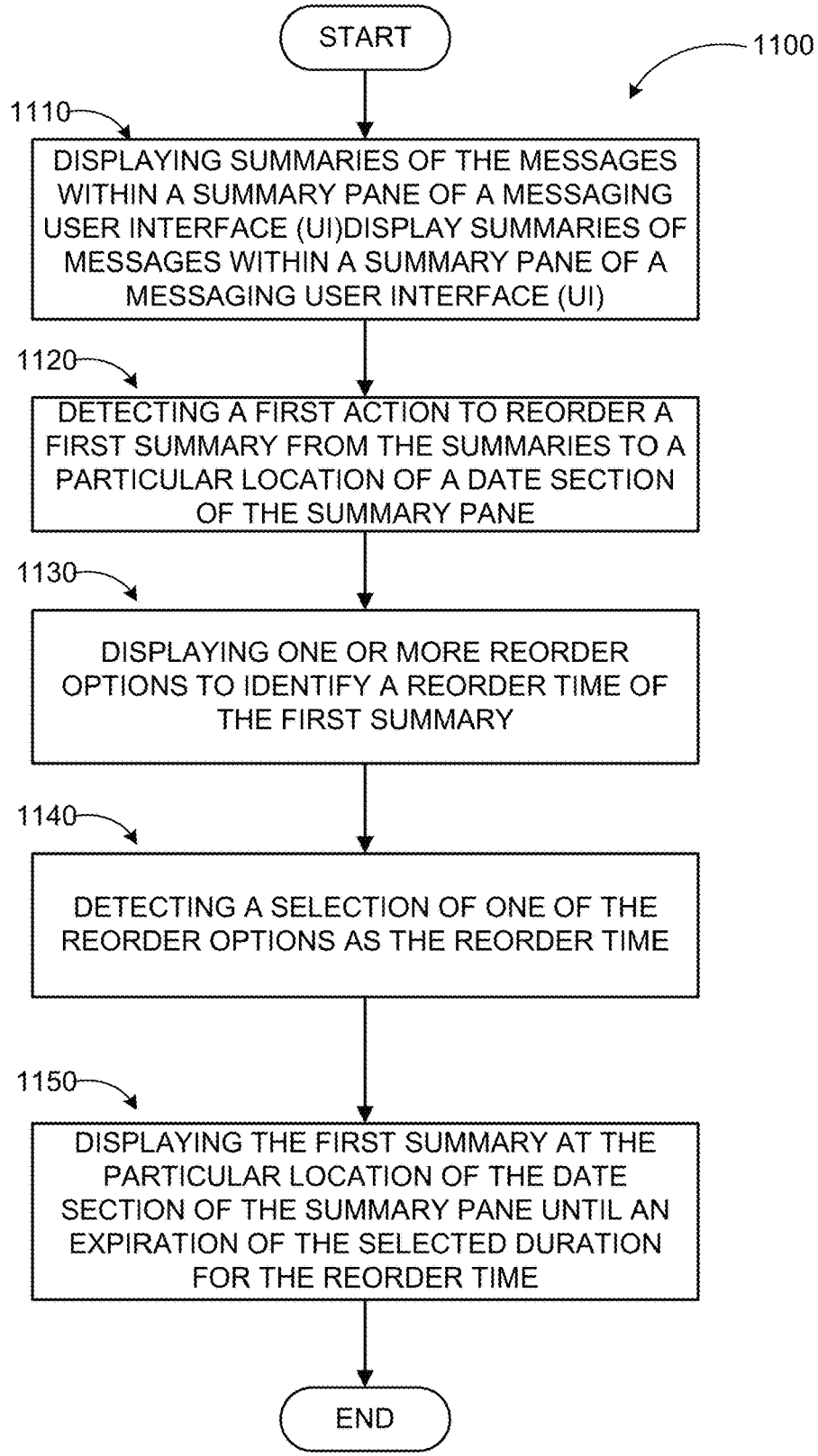
FIG. 11 illustrates a logic flow diagram for a process to restructure a view of messages based on a configurable persistence, according to embodiments.

FIG. 11 illustrates a logic flow diagram for a process to restructure a view of messages based on a configurable persistence, according to embodiments. Process 1100 may be implemented on a communication application.

Process 1100 begins with operation 1110, where summaries of the messages may be displayed within a summary pane of a messaging user interface (UI). The messages may include emails, text based messages, audio messages, or video messages, among others. At operation 1120, an action may be detected to reorder a summary from the summaries on a top location of a date section of the summary pane. Reorder options may be displayed to identify a reorder time of the summary at operation 1130. A selection of one of the reorder options may be detected as the reorder time, at operation 1140. The summary may be relocated to the top location of the date section of the summary pane to display the summary at the top location of the date section until an expiration of the selected duration for the reorder time at operation 1150.

The operations included in process 1100 are for illustration purposes. A communication application according to embodiments may be implemented by similar processes with fewer or additional steps, as well as in different order of operations using the principles described herein.

According to some examples, a method that is executed on a computing device to restructure a view of messages based on configurable persistence may be described. The method may include displaying summaries of the messages within a summary pane of a messaging user interface (UI), detecting a first action to reorder a first summary from the summaries to a particular location of a date section of the summary pane, displaying one or more reorder options to identify a reorder time of the first summary, detecting a selection of one of the reorder options as the reorder time, and displaying the first summary at the particular location of the date section of the summary pane until an expiration of the selected duration for the reorder time.

According to other examples, the method may further include upon detecting the expiration of the selected duration for the reorder time, displaying the first summary at an expiration location on the summary pane that corresponds to timestamp at an expiration of the reorder time. The method may further include detecting the first action as a horizontal swipe action on the first summary. The method may further include displaying the one or more reorder options at one from a set of: below the first summary and overlaid on the first summary, wherein the one or more reorder options include one or more default tie periods and a user configurable time period. The method may further include reducing a horizontal length of the first summary to display a reduced first summary that provides reduced information of a corresponding message, wherein the particular section is a top location of the date section of the summary pane.

According to further examples, the method may further include displaying one or more of a sender identification, a receiver identification, a message subject, a single line summary of a message content, and a timestamp for each of the summaries on the summary pane and replacing the timestamp of a corresponding message with the reorder time on the first summary. The method may further include placing new summaries for incoming messages below the first summary. The method may further include in response to the expiration of the selected duration for the reorder time, displaying a current time as a timestamp on the first summary, and allowing new summaries of incoming messages to be placed above the first summary. The method may further include displaying a reorder control on the first summary that includes an option to deactivate a reordered status of the first summary, detecting a second action deactivating the reorder control, displaying a current time as a timestamp on the first summary, and allowing new summaries of incoming messages to be placed above the first summary. The method may further include displaying a reorder control on an unordered summary of the summaries, that includes an option to activate a reordered status of the unordered summary, detecting a second action activating the reorder control, placing the unordered summary adjacent to the first summary during a default reorder time, and replacing a timestamp of a corresponding message on the unordered summary with the reorder time.

According to some examples, a computing device to restructure a view of messages based on configurable persistence may be described. The computing device may include a memory, a processor coupled to the memory and the display device. The processor may be configured to execute a communication application. The communication application may be configured to display, on the display device, summaries of the messages within a summary pane of a messaging user interface (UI), on the display device, wherein the messages include one of an email, a task, a note, or a scheduling of an item, detect a first action to reorder a first summary from the summaries of the summary pane, display, on the display device, one or more reorder options to identify a reorder time of the first summary, wherein the one or more reorder options include one or more default tie periods and a user configurable time period, detect a selection of one of the reorder options as the reorder time, display, on the display device, the first summary at a top location of a date section of the summary pane until an expiration of the selected duration for the reorder time, and upon detecting the expiration of the selected duration for the reorder time, display, on the display device, the first summary at an expiration location on the summary pane that corresponds to timestamp at an expiration of the reorder time.

According to other examples, the communication application may be further configured to detect a second action to scroll through the summary pane to display future items above the first summary, display the future items above the first summary on the summary pane during a reorder time associated with the future items, and display a deferred message as one of the future items above the first summary. The communication application may be further configured to provide one or more configuration controls to allow an authorized user to configure the first action to include one or more of a swipe action, a touch action, a mouse click event, a hover event, and a keyboard action. The communication application may be further configured to provide one or more configuration controls to allow an authorized user to configure a default reorder time, a highlight color, a background color, and an archive folder associated with operations to reorder the first summary. The communication application may be further configured to place a future item in a top location of a date section associated with the future item above the first summary.

According to some examples, a computer-readable memory device with instructions stored thereon to restructure view of messages based on configurable persistence may be described. The instructions may include actions that are similar to method described above.

According to some examples, a means to restructure view of messages based on configurable persistence may be described. The means to restructure view of messages based on configurable persistence may include a means for displaying summaries of the messages within a summary pane of a messaging user interface (UI), a means for detecting a first action to reorder a first summary from the summaries to a particular location of a date section of the summary pane, a means for displaying one or more reorder options to identify a reorder time of the first summary, a means for detecting a selection of one of the reorder options as the reorder time, and a means for displaying the first summary at the particular location of the date section of the summary pane until an expiration of the selected duration for the reorder time.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to restructure a view of messages based on configurable persistence, the method comprising:
   displaying summaries of the messages within a summary pane of a messaging user interface (UI);
   inferring a due date based on a content of a first message from the messages;
   automatically reordering the displayed summaries such that a first summary associated with the first message is moved from an original location on the summary pane that corresponds to a receipt time of the first message to a top location on the summary pane for a duration of a reorder time based on the inferred due date;
   displaying the reorder time within the first summary instead of the receipt time of the first message in order to distinguish the first summary from remaining summaries; and
   upon an expiration of the duration of the reorder time, displaying the first summary at the original location on the summary pane that corresponds to the receipt time of the first message.

2. The method of claim 1, further comprising:
   reducing a horizontal length of the first summary to display a reduced first summary that provides reduced information of the first message.

3. The method of claim 1, further comprising:
   displaying one or more of a sender identification, a receiver identification, a message subject, a single line summary of a message content, and a timestamp for each of the summaries on the summary pane.

4. The method of claim 3, further comprising:
   replacing the timestamp of the first message with the reorder time on the first summary.

5. The method of claim 1, further comprising:
   placing new summaries for incoming messages below the first summary.

6. The method of claim 1, further comprising:
   upon detecting the expiration of the duration for the reorder time,
     displaying a current time as a timestamp on the first summary, and
     allowing new summaries of incoming messages to be placed above the first summary.

7. The method of claim 1, further comprising:
   displaying a reorder control on the first summary that includes an option to deactivate a reordered status of the first summary;
   detecting a selection of the option to deactivate the reordered status of the first summary;
   displaying a current time as a timestamp on the first summary; and
   allowing new summaries of incoming messages to be placed above the first summary.

8. The method of claim 1, further comprising:
   detecting an action to reorder a second summary associated with a second message from the messages from an original location on the summary pane that corresponds to a receipt time of the second message to the top location on the summary pane;
   displaying one or more reorder options associated with the second summary;
   detecting a selection of one of the reorder options as the reorder time; and
   displaying the second summary at the top location on the summary pane until a duration for the reorder time has expired, wherein the reorder time is displayed within the second summary instead of the receipt time of the second message in order to distinguish the second summary from remaining summaries.

9. The method of claim 8, further comprising:
detecting the action as a horizontal swipe action on the second summary.

10. The method of claim 8, further comprising:
displaying the one or more reorder options at one from a set of: below the second summary and overlaid on the second summary, wherein the one or more reorder options include one or more default time periods and a user configurable time period.

11. A computing device to restructure a view of messages based on configurable persistence, the computing device comprising:
a memory;
a processor coupled to the memory, the processor executing a communication application in conjunction with instructions stored in the memory, wherein the communication application is configured to:
display summaries of the messages within a summary pane of a messaging user interface (UI), wherein the messages include one of an email, a task, a note, or a scheduling of an item;
infer a due date based on a content of a first message from the messages;
automatically reorder the displayed summaries such that a first summary associated with the first message is moved from an original location on the summary pane that corresponds to a receipt time of the first message to a top location on the summary pane for a duration of a reorder time based on the inferred due date;
display the reorder time within the first summary instead of the receipt time of the first message in order to distinguish the first summary from remaining summaries; and
upon detecting an expiration of the duration of the reorder time, display the first summary at the original location on the summary pane that corresponds to the receipt time of the first message.

12. The computing device of claim 11, wherein the communication application is further configured to:
detect an action to scroll through the summary pane to display future items above the first summary; and
display the future items above the first summary on the summary pane during a reorder time associated with the future items.

13. The computing device of claim 12, wherein the communication application is further configured to:
display a deferred message as one of the future items above the first summary.

14. The computing device of claim 11, wherein the communication application is further configured to:
detect an action to reorder a second summary associated with a second message from the messages from an original location on the summary pane that corresponds to a receipt time of the second message to the top location on the summary pane; and
provide one or more configuration controls to allow an authorized user to configure the action to include one or more of a swipe action, a touch action, a mouse click event, a hover event, and a keyboard action.

15. The computing device of claim 11, wherein the communication application is further configured to:
place a future item in the top location on the summary pane associated with the future item above the first summary.

16. A computer-readable memory device with instructions stored thereon to restructure view of messages based on configurable persistence, the instructions comprising:
displaying summaries of the messages within a summary pane of a messaging user interface (UI), wherein the messages include one or more of an email, a text based message, an audio message, and a video message;
inferring a due date based on a content of a first message from the messages;
automatically reordering the displayed summaries such that a first summary associated with the first message is moved from an original location on the summary pane that corresponds to a receipt time of the first message to a top location on the summary pane for a duration of a reorder time based on the inferred due date;
displaying the reorder time within the first summary instead of the receipt time of the first message in order to distinguish the first summary from remaining summaries; and
upon detecting an expiration of the duration of the reorder time, displaying the first summary at the original location on the summary pane that corresponds to the receipt time of the first message.

17. The computer-readable memory device of claim 16, wherein the instructions further comprise:
detecting an action to reorder a second summary associated with a second message from the messages from an original location on the summary pane that corresponds to a receipt time of the second message to the top location on the summary pane, wherein the action is detected as a horizontal swipe action on the second summary;
displaying one or more reorder options associated with the second summary within a menu that includes one or more of a today option, a tomorrow option, a next week option, at work option, at keyboard option, and a custom option for a reorder time;
displaying the menu below the second summary or overlaid on the second summary;
detecting a selection of one of the reorder options as the reorder time; and
displaying the second summary at the top location on the summary pane until an expiration of a duration for the reorder time, wherein the reorder time is displayed within the second summary instead of the receipt time of the second message in order to distinguish the second summary from remaining summaries.

18. The computer-readable memory device of claim 16, wherein the instructions further comprise:
detecting an action to scroll through the summary pane to display future items above the first summary;
displaying future items above the first summary on the summary pane during a reorder time associated with the future items; and
displaying one or more of an appointment, and a deferred message as the future items.

* * * * *